United States Patent [19]

Kervagoret

[11] Patent Number: 4,465,099
[45] Date of Patent: Aug. 14, 1984

[54] DISTRIBUTION APPARATUS, ESPECIALLY FOR ASSISTED STEERING SYSTEM

[75] Inventor: Gilbert Kervagoret, Argenteuil, France

[73] Assignee: Societe Anonyme D.B.A., Paris, France

[21] Appl. No.: 323,845

[22] Filed: Nov. 23, 1981

[30] Foreign Application Priority Data

Dec. 2, 1980 [FR] France ................ 80 25545

[51] Int. Cl.³ .............................. F15B 9/10
[52] U.S. Cl. .................... 137/625.23; 137/625.24; 91/375 A; 91/375 R
[58] Field of Search .............. 137/625.21, 625.22, 137/625.23, 625.24; 91/375 A, 375 R

[56] References Cited

U.S. PATENT DOCUMENTS 2,939,429 6/1960 Charlson ................ 91/375 R X
4,335,749 6/1982 Walter .................... 91/375 A

FOREIGN PATENT DOCUMENTS 2160548 4/1973 France.
2445255 6/1980 France.
2437968 11/1980 France.

Primary Examiner—Alan Cohan
Attorney, Agent, or Firm—Larry J. Palguta; Paul D. Schoenle; Ken C. Decker

[57] ABSTRACT

A distribution apparatus of the invention comprises a distribution circuit whose passages of variable section are formed by the partial overlapping of holes of circular contour cut in a distribution element and longitudinal grooves cut in another distribution element.

18 Claims, 6 Drawing Figures

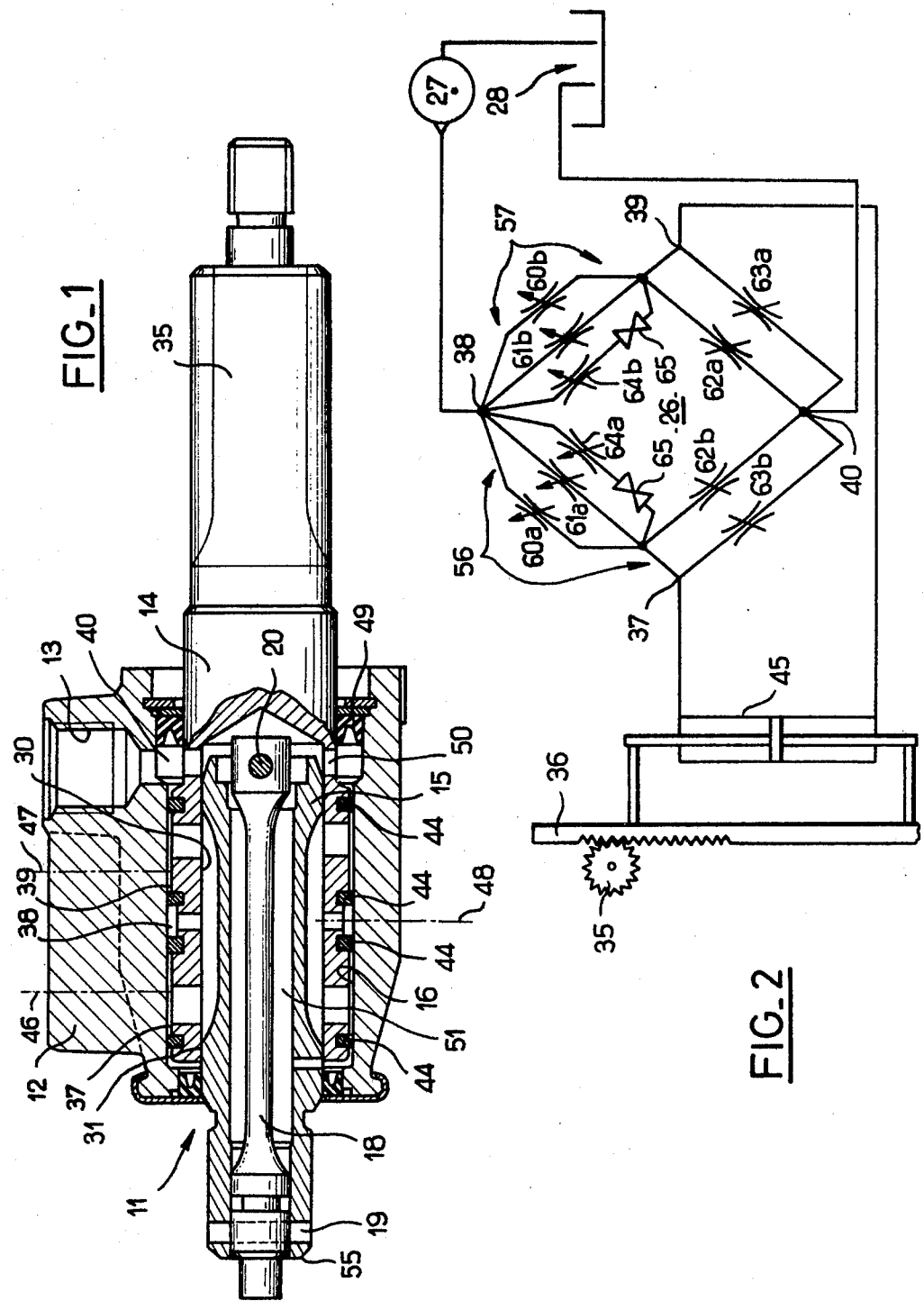

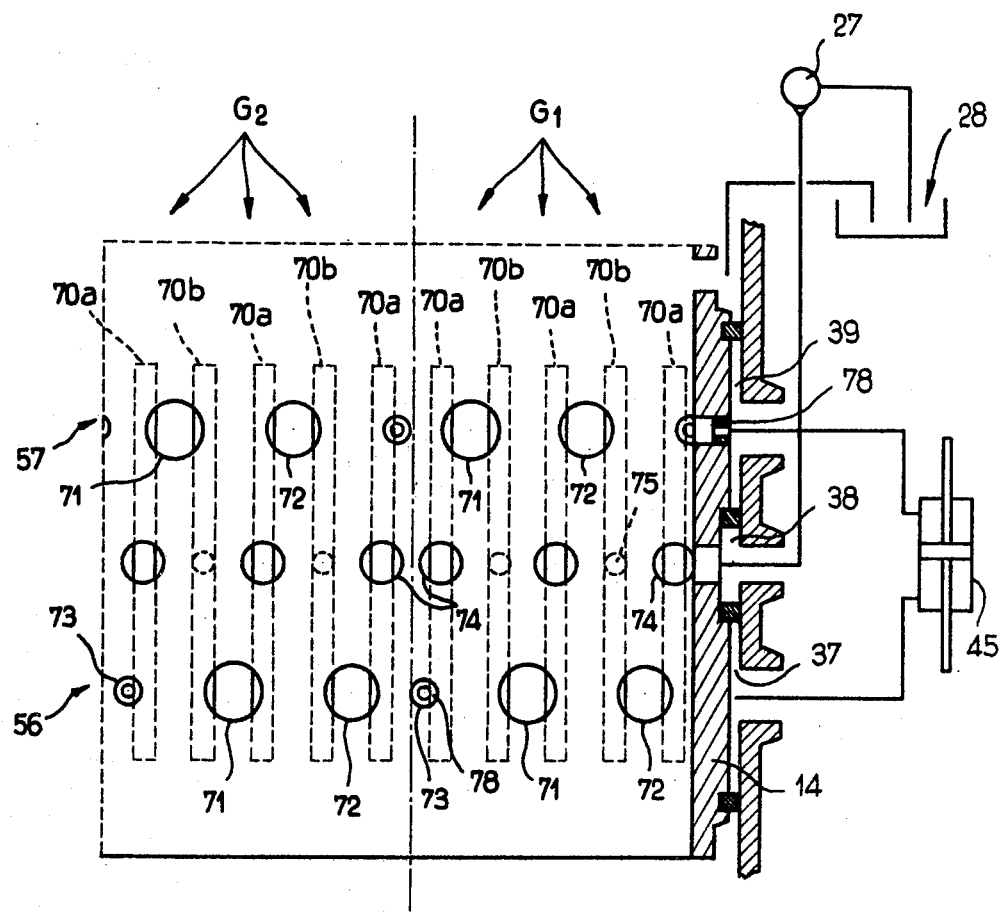
FIG_5

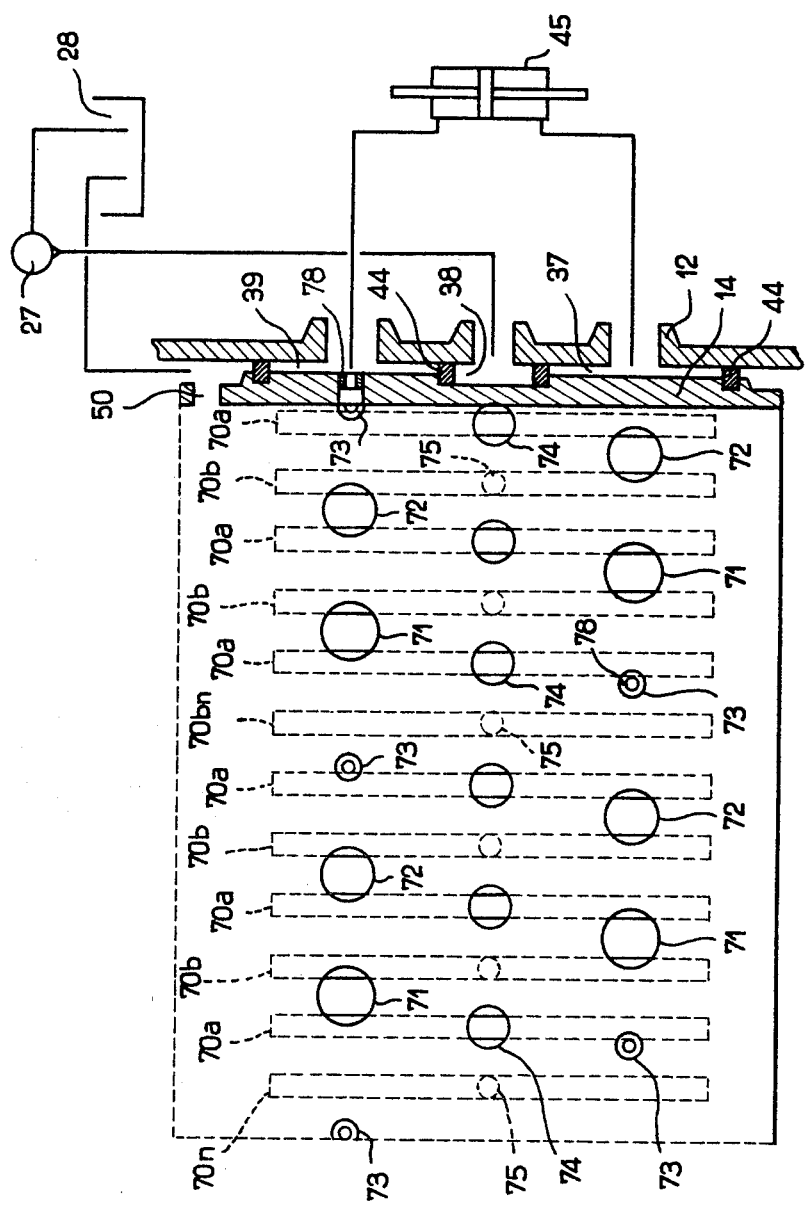
FIG_6

DISTRIBUTION APPARATUS, ESPECIALLY FOR ASSISTED STEERING SYSTEM

The invention concerns a distribution apparatus for hydraulic servomechanisms and especially a distribution valve for an assisted steering system for a motor vehicle, whose distribution structure is extremely simple from the manufacturing angle. Secondly, the invention concerns eliminating operating noises such as whistling deriving from cavitation phenomena.

There is a known distribution apparatus for servomechanisms comprising two fluid distribution elements which are cylindrical, coaxial, capable of a limited relative rotation about their common axis and have apertures and cavities defining a fluid circulation circuit between a source of fluid and a reservoir for fluid. More precisely, the fluid circulation circuit is defined by the cooperation of longitudinal grooves cut in the outer cylindrical surface of the inner distribution element or rotor with apertures cut through the wall of the outer distribution element or stator. Some of the apertures cut in the stator are wide, substantially rectangular windows, two opposite edges of which cooperate with two edges of adjacent grooves of the rotor, one of the grooves communicating with the source of fluid and the other groove communicating with the reservoir. These rectangular windows require accurate machining by electron discharge which is relatively expensive and tricky to implement in a high volume production line. In particular, the two opposite edges of the rectangular window should have a particular profile determining the Pressure-Angle of relative rotation characteristic of the distributor. The invention derives from the discovery that it is possible to obtain a comparable characteristic for the distributor by replacing the substantially rectangular window by a combination of holes of circular contour.

More precisely, the invention therefore concerns an hydraulic distribution apparatus for servomechanisms, especially for assisted steering, of the type comprising two fluid distribution elements, which are cylindrical, coaxial and capable of a limited relative rotation about their common axis to both sides of a neutral relative position, these distribution elements having apertures and cavities defining a fluid circulation circuit which can be connected between a source of fluid and a reservoir for fluid, this circuit having two distribution branches arranged in parallel, provided with passages of variable section defined in a cylindrical surface of contact of said distribution elements and especially including in each branch two types of passage with opposite directions of variation of aperture for either direction of said rotation beyond said neutral relative position, passages of these two types communicating with a working pressure output point of the branch concerned, characterised in that the afore-said passages of variable section are all formed by the partial overlapping of longitudinal grooves made in a cylindrical surface of one of the distribution elements and holes of circular contour cut radially through the other distribution element and in that passages of the same type are arranged in parallel in one and the same branch of said circuit with different flow sections at least for a range of relative rotation between the two distribution elements about said neutral relative position, to obtain a required law of variation relating the increase in available pressure at one of said pressure output points to the angle of relative rotation in the corresponding direction.

Secondly, the object of the invention is also to eliminate the operating noise when the fluid pressure in the distributor increases to the point of causing cavitation phenomena. To obtain this, each branch is provided with a passage therein for high pressures whose complete closure for a corresponding direction of relative rotation of said distribution elements is set for an angle of relative rotation for which all the other passages of the same type are closed and this passage for high pressures is set in series with a flow restrictor, the unit constituted by this passage and the said restrictor being connected between means for connection to said fluid source and the pressure output point of the branch concerned.

Thus, the series combination of the passage for high pressures and the flow restrictor is positioned in each branch between the pump and the cylinder, which eliminates any effect of this anti-noise arrangement on the rest pressure of each branch. A substantial reduction in drift while driving in a straight line and at high speed is thus noted.

The invention will be better understood and its other advantages will appear more clearly in the following description of several embodiments of an hydraulic distribution apparatus according to the invention given solely by way of example and described with reference to the attached drawings in which:

FIG. 1 represents a general view partly in section of an apparatus forming a distribution valve, according to the invention, for a motor vehicle assisted steering system;

FIG. 2 is a diagram illustrating the hydraulic circuit of this assisted steering system, using the distribution valve of FIG. 1;

FIG. 5 is a similar view to that of FIG. 3, of a possible first variant and,

FIG. 6 is a similar view to that of FIG. 3, of a second possible variant.

Figure 3:
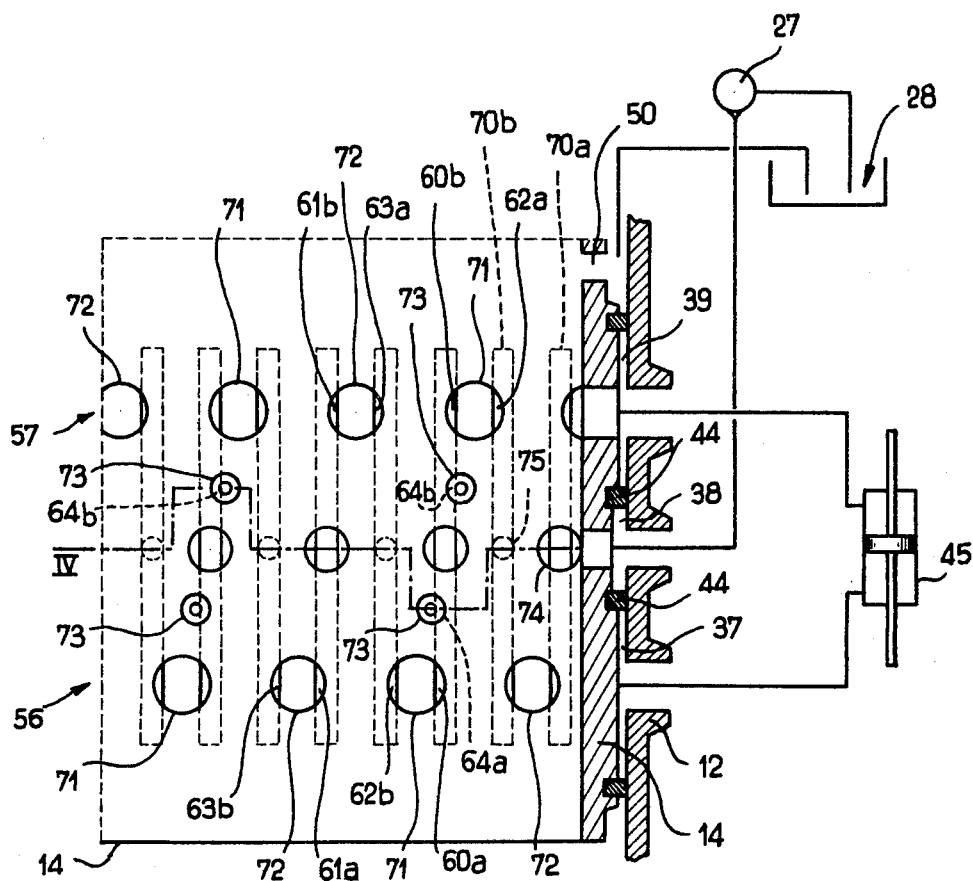
FIG. 3 is an opened out view of the two distribution elements of the valve of FIG. 1 with, in the part to the right with regard to the drawing, a diagrammatic view in section of the outermost distribution element cooperating with the fixed casing of the valve to which the other parts of the hydraulic circuit of FIG. 2 are coupled, according to a diagrammatic representation.

With reference to FIG. 1, the distribution apparatus 11 according to the invention essentially comprises a fixed casing 12, provided with connectors such as, for example, the connector 13 and having a bore 16 housing two cylindrical and coaxial fluid distribution elements 14 and 15, each having a sleeve-shaped part. The innermost distribution element 15 is conventionally guided for rotation in the sleeve formed by the outermost distribution element 14, while the internal space of the sleeve formed by the distribution element 15 houses a torsion bar 18 connected, at one of its ends, to the distribution element 15 by a pin 19 and, at its other end, to the distribution element 14 by a pin 20. This torsion bar therefore constitutes, in a known way, a means for returning to a relative neutral position allowing a limited rotation, of a few degrees, of one distribution element with respect to the other about their common axis (coinciding with that of the torsion bar 18) and to both sides of said neutral relative position. In addition, the distribution elements also have apertures and cavities whose complex arrangement will be described in more detail with reference to FIGS. 2 to 4, and which define a fluid circulation circuit 26 (see FIG. 2) between a source of fluid such as a pump 27 and a reservoir 28 for fluid. It will only be noted at this stage of the description that the aforesaid apertures and cavities cooperate to form passages of variable section operating by overlapping of the cylindrical surfaces 30 and 31 in contact of the distribution elements 14 and 15, respectively at the time of an afore-said limited relative rotation. As the distribution apparatus 11 is more particularly intended for an assisted steering system, the outer sleeve forming the distribution element 14 is extended by an output shaft 35 intended to be coupled, for example, to a rack 36 (see FIG. 2) of a steering mechanism. This distribution element 14, also termed the stator, is guided for rotation in the bore 16 and longitudinally adjacent annular spaces (37, 38, 39, 40) are separated between the outer surface of the distribution element 14 and the surface of the bore 16, by means of annular seals 44 and 49, to form parts of the fluid circulation circuit 26 and particularly two working pressure output points, coinciding with the annular spaces 37 and 39 and intended to be connected to the two pressure chambers of an hydraulic assisting motor such as a double-acting cylinder 45 (FIG. 2) connected to the rack 36. The annular spaces 37 and 39 are in communication with the cylinder 45 by means of connectors of the casing 12, not shown in FIG. 1, but represented by their axis lines 46 and 47, respectively. Similarly, the annular space 38 is connected to the outlet of the pump 27 by a connector of the casing 12 represented by the axis line 48, the unit constituting the means for connection to the source of fluid cited above. The space 40 (delimited at one of its ends by the seal 49) communicates with the connector 13 which constitutes the outlet for return to the reservoir 28. Radial holes 50 in the element 14 put the space 40 in communication with the internal space 51 of the distribution element 15, in which the torsion bar 18 is housed. The innermost distribution element 15 is still termed the rotor because it is intended to be connected by its axial end 55 to the steering column (not shown) of a vehicle.

The fluid circulation circuit 26 will now be described with reference to FIGS. 2 to 4. This circuit is conventionally composed essentially of two parallel branches 56, 57 provided with afore-said passages of variable section. Two kinds of passage with opposite variation of aperture for either direction of said relative rotation beyond the afore-said neutral relative position of the two distribution elements 14 and 15 can be distinguished. In this neutral position, the torsion bar 18 is subject to no stress. In the remainder of the description, the passages of one or other type will be differentiated by reference numerals with the indices "a" or "b" respectively. Thus, according to a feature of the invention, two passages 60a 61a are provided in the branch 56 which are arranged in parallel between the annular fluid supply space 38 and the pressure output point 37 and two passages 62a, 63a in the branch 57 are arranged in parallel between the pressure output point 39 and the annular space 40 for the return to the reservoir, (see FIG. 2). Similarly, two passages 60b, 61b, are provided in the branch 57, which are arranged in parallel between the annular space 38 and the pressure output point 39 as well as two passages 62b, 63b, in the branch 56 arranged in parallel between the pressure output point 37 and the annular space 40. Thus, each branch 56 or 57 has passages of variable section of two types (indices "a" and "b") set in series between the source of fluid (pump 27) and the reservoir 28 and a circuit portion between passages of different types communicates with a pressure output point (37, 39) of the branch (56, 57, respectively) concerned.

In addition, two other passages of variable section are provided which will be hereinafter termed "passages for high pressures", a passage 64a in the branch 56 and a passage 64b in the branch 57. The passage 64a is set in series with a flow restrictor 65, of constant flow section, and the unit constituted by this passage and this restrictor is connected between the annular space 38 and the pressure output point 37. Similarly, the passage 64b is set in series with a flow restrictor 65, of constant flow section, and the unit constituted by this passage and this restrictor is connected between the annular space 38 and the pressure output point 39. These passages 64a and 64b are termed "passages for high pressures" because complete closure of them, for a corresponding direction of relative rotation, is set for an angle for which all the other passages of the same type are already closed. For example, complete closure of the passage 64a only occurs after that of the passages 60a, 61a, 62a, 63a, with a given direction of relative rotation and during this last range of relative rotation possible between the distribution elements 14 and 15, the flow-rate of fluid in the branch 56 is determined essentially by the sections of the passages 64a and 65. It will be noted that over this range which involves relatively high operating pressures the flow of fluid between the pressure output point 39 and the annular space 40 is totally cut off while the pressure drop between the annular space 38 and the pressure output point 37 (whose pressure is very near that of the reservoir 28 because of the opening of the passages 62b, 63b) is entirely ensured by the flow-rate of fluid through the passages 64a and 65 connected in series. A substantial pressure loss thus appears at the terminals of the restrictor 65 in the branch 56. This back-pressure at the terminals of the restrictor 65 allows the cavitation threshold to be put back in the passage 64a and therefore also the noisy operating threshold of the distributor to be put back, this threshold depending advantageously on the value of the back-pressure. Thus, a back-pressure of a few bars is enough to put back the noisy operating threshold to several tens of bars upstream of the corresponding passage 65. Operating noise is thus eliminated over the whole range of relative rotation of the distributor elements, i.e. over the whole range of working pressures of the cylinder 45. Similarly, complete closure of the passage 64b only occurs "after" that of the passages 60b, 61b, 62b, 63b, and clearly everything described above with reference to the passage 64a and the restrictor 65 in the branch 56 holds true for the passage 64b and the restrictor 65 in the branch 57, for the other direction of relative rotation.

It is advantageous to position the series combination of the passage for high pressures (64a, 64b respectively) and the restrictor 65 upstream of the cylinder 45 because, with such an arrangement, the anti-noise system has no effect on the rest pressure which substantially reduces drift during driving in a straight line and at high speed, especially if the assisting cylinder used is asymmetric.

Figure 4:
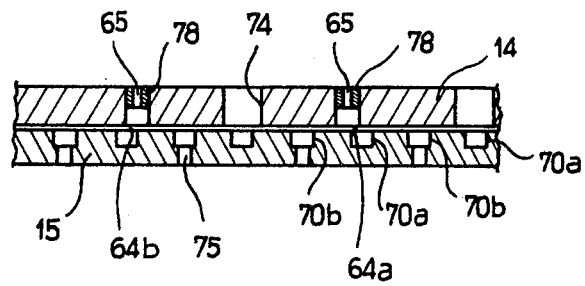
FIG. 4 is a section IV—IV of FIG. 3.

FIGS. 3 and 4 show how the different passages and flow restrictors constituting the fluid circulation circuit 26 are constructed.

The distribution element 15, forming the rotor, is provided with eight longitudinal grooves 70 made in its outer cylindrical surface 31 and closed at their axial ends. These grooves are regularly angularly spaced relative to each other by 45°. Four grooves 70a or fluid supply grooves, are closed and permanently disposed opposite holes 74 of circular contour of the distribution element 14 which communicate with the annular space 38 connected to the pump 27. Four other grooves 70b, or fluid discharge grooves, are disposed alternately with the grooves 70a and pierced with holes 75 establishing communication with the internal space 51 housing the torsion bar 18, i.e. with the reservoir 28 via the discharge holes 40 and the connector 13.

The distribution element 14 itself only has holes 71, 72, 73 of circular contour to form all the afore-said passages of variable section, operating by partial overlapping of said grooves and said holes.

This feature of the invention is advantageous because it allows shaping by electron discharge machining of the openings cut through the distribution element 14 to be eliminated. According to the invention, the "Pressure-Angle of relative rotation" characteristic of the distributor can still be adapted to any law of variation required through the fact that passages of the same type are arranged in parallel in one and the same branch 56 or 57 of the circuit 26 with different flow sections at least for a range of relative rotation between the two distribution elements about the neutral relative position. A required law of variation is thus obtained between the increase in available pressure at one of the pressure output points and the angle of relative rotation in the corresponding direction, through a judicious choice of a combination of apertures with different flow sections, these different flow sections being considered, for example, at the neutral relative position of the distributor elements. In the embodiment of FIGS. 3 and 4, the differences in flow section between the passages 60, 61, (or 62, 63) are simply obtained by differences in diameter between the corresponding holes 71 and 72. In fact, some passages of different types of one and the same branch (60a, 62b) or (61a, 63b) are arranged in pairs and one pair is defined by the cooperation of a hole in the stator 14 (71 or 72, respectively) with two adjacent grooves 70a, 70b, communicating respectively with the pump 27 and the reservoir 28, said hole being equidistant from the two grooves in the neutral relative position illustrated in FIG. 3 in particular. It is therefore understood that with such an arrangement, a simple difference in diameter between the holes 71 and 72, entirely determines the flow sections of the passages 60a, 62b, 61a, 63b, in relation to each other. In the example illustrated in FIG. 3, the holes 71 have a larger diameter than the hole 72. However, the afore-said passages for high pressures, (64a or 64b), are not arranged in pairs but formed simply by the cooperation of a hole 73 with an edge of one of the grooves 70a, the edge being selected in dependence upon the direction of variation of the sections required. More precisely, for each branch 56, 57, a hole 73 in one of said passages for high pressures cooperates with one edge of the groove 70a which also forms the passage of the same type (60a, 60b respectively) of the afore-said one of the pairs of passages in cooperation with a hole 71 partially overlapping two adjacent grooves 70a, 70b. Of course, the positioning of the holes 73 with respect to the grooves 70a is such that complete closure of the passages 64 is set for an angle of relative rotation for which all the other passages of the same type are closed, as mentioned previously. Also, the diameter of the holes 73 is significantly less than that of the holes 71 and 72 so that they are never able to communicate with the adjacent grooves 70b.

It has been determined that the combination of two and preferably three passages of different initial section, defined by the cooperation of rectilinear grooves in the rotor and holes of circular contour in the stator, allows a suitable "Pressure-Angle of relative rotation" characteristic to be obtained, and, in particular, an approximately parabolic characteristic comparable to that obtained with a combination of passages of variable section, some having rectangularly shaped windows with non-rectilinear edges making it necessary to carry out stages of machining by electron discharge. Also, each afore-said flow restrictor 65 is formed in the stator 14 by a tubular portion 78, or ring, of predetermined internal section, partially closing, over part of its depth, the hole 73 of the passage 64a or 64b for high pressures with which it is set in series (see FIG. 4). Lastly, a further structural feature simplifying manufacture should be noted. Each branch 56, 57 according to the embodiment of FIGS. 3 and 4 has in fact twice as many passages of variable section as the diagrammatic representation of FIG. 2. In other words, each branch 56 or 57 is provided with two identical series of pairs of the afore-said passages and two passages for high pressures (64a or 64b), said holes of circular contour (71, 72, 73) of the same diameter being diametrically opposite in pairs on the cylindrical distribution element 14 in which they are bored. Thus, two holes 71, two holes 72, two holes 73 are bored per branch 56 or 57 so that machining of the stator 14 consists essentially of extremely simple piercing operations, along diametral directions of the sleeve 14. Similarly, it should be noted that the holes 74 are also circular in contour and diametrically opposite in pairs.

The distribution valve functions as follows. If it is supposed that the user urges the rotor 15 into rotation in the clockwise direction, all the passages bearing the index "a" begin to close and all the passages bearing the index "b" begin to open. As the diameter of the holes 71 is greater than that of the holes 72, the passage 61a of the branch 56 and the passage 63a of the branch 57 close completely first. Then, for an additional relative rotation of the two elements of the distributor, complete closure of the passages 60a and 62a eventually results. During the course of this relative rotation, the increase in pressure at the pressure output point 39 develops according to a predetermined curve as a function of the angle of relative rotation (in particular a substantially parabolic curve), this curve resulting from the choice of diameters of the holes 71, 72, and 73 and of the particular positioning of the holes 73. For an additional relative rotation in the same direction, any communication between the pressure output point 39 and the reservoir 28 is cut off and so there is no cavitation in this branch and, in the opposite branch 56, the pressure drop between the annular space 38 connected to the pump 27 and the pressure output point 37 is entirely ensured by the flow-rate of fluid through the passage 64a and the restrictor 65 in series with it, as previously mentioned. Cavitation is avoided in this part of the branch 56 by the appearance of a back-pressure upstream of the restrictor 65, so that operation remains silent even in these high-pressure operating conditions corresponding especially to garaging manoeuvres with the vehicle equipped with such an assisted steering system.

The ebmodiment represented diagrammatically in FIG. 5, in which the structural elements already described have the same reference numerals, is particularly adapted for a design of distributor with reduced axial bulk. In this instance, it is necessary to provide specific fluid supply grooves 70a to define the passages for high pressures mentioned above, so as to obtain a better distribution of the flow-rates in the distribution circuit and limit pressure losses. In other words, when a high degree of miniaturization is reached, it is no longer desirable to define certain passages of the same type (such as 60a and 64a with reference to FIG. 3, for example) from one and the same fluid supply groove. According to the embodiment of FIG. 5, ten grooves are therefore provided: six fluid supply grooves 70a communicating through holes 74 cut in the stator 14 with the annular space 38 and four fluid discharge grooves 70b communicating as before with the reservoir 28. These grooves are distributed in circular symmetry on the outer surface of the rotor 15, alternately in two groups $G_1$ and $G_2$ each comprising three grooves 70a and two grooves 70b. In addition, for each branch 56 of 57, one of the fluid supply grooves 70a of a group $G_1$ or $G_2$ cooperates exclusively with a hole 73 of one of the afore-said passages for high pressures (64a or 64b) while the two other grooves 70a of this same group cooperate respectively with the two other fluid discharge grooves 70b and with the holes 71 and 72 of different diameters, to define the two pairs of passages of variable section, in a comparable way to that explained with reference to FIG. 3.

For reasons connected with the balancing of the two elements 14 and 15 of the distributor, the embodiment of FIG. 6 which has twelve grooves while observing the same principle of distribution as that represented diagrammatically in FIG. 5 can be considered preferable. According to this new variant, six fluid supply grooves 70a are then provided together with six fluid discharge grooves 70b distributed alternately in circular symmetry on the surface of the rotor 15. For each branch 56 or 57, there are therefore two grooves 70a which cooperate respectively and exclusively with two holes 73 in this branch, so as to define the passages for high pressures defined above, while the four other grooves 70a cooperate respectively with four fluid discharge grooves 70b and with the holes 71, 72 of different diameters to define the two series of two pairs of passages, in a similar way to the embodiments of FIGS. 3 and 5. The two latter fluid discharge grooves 70bn, or neutral grooves, do not cooperate with any hole in the stator 14. In operation, particularly at high pressures, the arrangement of grooves in which the high pressure of the pump and the low pressure of the reservoir prevail, regularly in alternation at the surface of the rotor, allows the effects of the rotor "sticking" to the stator to be very substantially reduced.

The invention is of course not limited to the three embodiments just described; it includes all the technical equivalents of means utilized, if these come within the scope of the following claims.

I claim:
1. Hydraulic distribution apparatus for servomechanisms, especially for assisted steering, of the type comprising two fluid distribution elements, which are cylindrical, coaxial and capable of a limited relative rotation about their common axis to both sides of a neutral relative position, these distribution elements having apertures and cavities defining a fluid circulation circuit (26) which can be connected between a source of fluid (27) and a reservoir for fluid (28), this circuit having two distribution branches (56, 57) arranged in parallel, provided with passages of variable section defined in the cylindrical surfaces of contact of said distribution elements and especially including, in each branch, two types of passage with opposite directions of variation of aperture for either direction of said relative rotation beyond said neutral relative position, some passages of these two types communicating with a working pressure output point (37, 39) of the branch concerned, characterized in that the aforesaid passages of variable section are all formed by partial overlapping of longitudinal grooves (70a, 70b) made in a cylindrical surface of one (15) of the distribution elements and holes (71, 72, 73) of circular contour cut radially through the other distribution element (14) and in that passages of the same type "a" or "b") are arranged in parallel in one and the same branch of said circuit with different flow sections at least for a range of relative rotation between the two distribution elements about said neutral relative position, to obtain a required law of variation relating the increase in available pressure at one of said pressure output points to the angle of relative rotation in the corresponding direction, each branch is provided with at least one passage (64a, 64b) of variable section for high pressures whose complete closure for a corresponding direction of relative rotation of said distribution elements (14, 15) is set for an angle of relative rotation for which all the other passages of the same type are closed, in that this passage for high pressures is set in series with a flow restrictor (65) and in that the unit constituted by this passage and said restrictor is connected between means (38) for coupling to said source of fluid and the pressure point (37 or 39) of said branch (56 or 57).

2. Apparatus according to claim 1, characterized in that said restrictor is formed in the distribution element (14) bearing said holes, by a ring (78) of predetermined internal section, which partially closes over part of its depth the hole (73) of circular contour of the passage (64) for high pressures with which it is set in series.

3. Apparatus according to claim 1 characterized in that each afore-said branch (56, 57) is provided with two identical series of pairs of the afore-said passages and two passages (64a or 64b) for the afore-said high pressures, said holes of circular contour (71, 72, 73) of the same diameter being diametrically opposite in pairs on the cylindrical distribution element (14) in which they are cut out.

4. Apparatus according to claim 3, characterized in that the distribution element (15) which has the aforesaid grooves is provided with eight grooves, four fluid supply grooves (70a) communicating with the means (38) for connection to said fluid source and four fluid discharge grooves (70b) communicating with said means (40) for connection to said reservoir (28), these grooves being distributed regularly and alternately and in that, for each branch, a hole (73) in one of the passages for high pressures cooperates with an edge of the groove (70a) which also forms the passage of the same type of one of the pairs of the afore-said passages, in cooperation with an afore-said hole (71) partially overlapping two adjacent grooves (70a, 70b).

5. Apparatus according to claim 3, characterized in that the distribution element (15) which has the aforesaid grooves is provided with ten grooves: six fluid supply grooves (70a) communicating with said means for connection to said source and four fluid discharge grooves (70b) communicating with said means for connection to said reservoir, these grooves being distributed regularly and alternately in two groups ($G_1$, $G_2$) each with three fluid supply grooves and two fluid discharge grooves, in that, for each branch, one of the fluid supply grooves of each group cooperates with a hole of one of the passages for high pressures while the two other fluid supply grooves (70a) cooperate respectively with the two other fluid discharge grooves (70b) and with the holes (71, 72) of different diameters to define two afore-said pairs of passages.

6. Apparatus according to claim 3, characterized in that the distribution element (15) which has the aforesaid grooves is provided with twelve grooves, six fluid supply grooves (70a) communicating with said means for connection to said fluid source and six fluid discharge grooves (70b) communicating with said means for connection to said reservoir, these grooves being distributed regularly and alternately in that, for each branch (56 or 57), two fluid supply grooves cooperate respectively with two holes (73) in the passages for high pressures while the four other fluid supply grooves (70a) cooperate respectively with four fluid discharge grooves (70b) and with the afore-said holes of different diameters (71, 72) to define two afore-said series of two pairs of different passages.

7. Apparatus according to claim 6, characterized in that the two other afore-said fluid discharge grooves (70bn) do not cooperate with any of the afore-said holes of circular contour.

8. Hydraulic distribution apparatus for servomechanisms, especially for assisted steering, of the type comprising two fluid distribution elements, (14, 15), which are cylindrical, coaxial and capable of a limited relative rotation about their common axis to both sides of a neutral relative position, these distribution elements having apertures and cavities defining a fluid circulation circuit (26) which can be connected between a source of fluid (27) and a reservoir for fliud (28), this circuit having two distribution branches (56, 57) arranged in parallel, provided with passages of variable section (60, 61, 62, 63, 64) defined in the cylindrical surfaces (30, 31) of contact of said distribution elements and especially including, in each branch, two types of passage with opposite directions of variation of aperture for either direction of said relative rotation beyond said neutral relative position, some passages of these two types ("a", "b") communicating with a working pressure output point (37, 39) of the branch concerned, characterized in that each branch is provided with at least one passage of variable section for high pressures (64a, 64b) whose complete closure, for a corresponding direction of relative rotation, is set for an angle of relative rotation, for which all the other passages of the same type are closed, in that this passage for high pressure is set in series with a flow restrictor (65) and in that the unit constituted by this passage and said restrictor is connected between means (38) for connection to said source of fluid and the pressure output point of said branch.

9. Apparatus according to claim 8 of the type in which said passages of variable section are formed by the partial overlapping of longitudinal grooves (70) made in a cylindrical surface of one (15) of the distribution elements and holes cut through the other (14) distribution element characterized in that the hole (73) which corresponds to said passage for high pressures is partially closed over part of its depth by a tubular portion (78) of predetermined internal section forming said flow restrictor (65) with which said passage for high pressures is set in series.

10. Apparatus according to claim 9, characterized in that said hole (73) which corresponds to said passage for high pressures is a hole of circular contour, pierced radially through the corresponding distribution element (14).

11. Apparatus according to claim 8 of the type in which said passages of variable section are formed by the partial overlapping of longitudinal grooves (70) made in a cylindrical surface of one of the distribution elements and windows cut through the other distribution element, characterized in that all said windows (71, 72, 73) are holes of circular contour.

12. Apparatus according to claim 11, characterized in that passages of one and the same type ("a" or "b") are arranged in parallel in one and the same branch (56 or 57) of said circuit with different flow sections at least for a range of relative rotation between the two distribution elements about said neutral relative position, to obtain a required law of variation relating the increase in available pressure at one of said pressure output points to the angle of relative rotation in the corresponding direction.

13. Apparatus according to claim 12, characterized in that as passages of different types of one and the same branch are arranged in pairs, a pair is defined by the cooperation of an aforesaid hole (71 or 72) with two parallel adjacent grooves (70a, 70b), one of which communicates with the means (38) for connection to said source of fluid and the other with means (40) for connection to said reservoir for fluid, said hole being equidistant from these two grooves in said neutral relative position and in that two different pairs of one and the same branch are provided with respective holes (71, 72) of different diameters.

14. Apparatus according to claim 13 characterized in that each aforesaid branch (56, 57) is provided with two identical series of pairs of the aforesaid passages and two passages (64a or 64b) for the aforesaid high pressures, said holes of circular contour (71, 72, 73) of the same diameter being diametrically opposite in pairs on the cylindrical distribution element (14) in which they are cut.

15. Apparatus according to claim 14, characterized in that the distribution element (15) which has the aforesaid grooves is provided with eight grooves, four fluid supply grooves (70a) communicating with the means (38) for connection to said fluid source and four fluid discharge grooves (70b) communicating with said means (40) for connection to said reservoir (28), these grooves being regularly and alternately distributed and in that, for each branch, a hole (73) in one of the passages for high pressures cooperates with an edge of the groove (70a) which also forms the passage of the same type of one of the pairs of the aforesaid passages, in cooperation with an aforesaid hole (71) partially overlapping two adjacent grooves (70a, 70b).

16. Apparatus according to claim 14, characterized in that the distribution element (15) which has the aforesaid grooves is provided with ten grooves: six fluid supply grooves (70a) communicating with said means for connection to said source and four fluid discharge grooves (70b) communicating with said means for connection to said reservoir, these grooves being distributed regularly and alternately in two groups (G and G) each with three fluid supply grooves and two fluid discharge grooves, in that, for each branch, one of the fluid supply grooves of each group cooperates with a hole of one of the passages for high pressures while the two other fluid supply grooves (70a) cooperate respectively with the two other fluid discharge grooves (70b) and with the holes (71, 72) of different diameters to define two aforesaid pairs of passages.

17. Apparatus according to claim 14, characterized in that the distribution element (15) which has the aforesaid grooves is provided with twelve grooves, six fluid supply grooves (70a) communicating with said means for connection to said fluid source and six fluid discharge grooves (70b) communicating with said means for connection to said reservoir, these grooves being distributed regularly and alternately in that, for each branch (56 or 57), two fluid supply grooves cooperate respectively with two holes (73) in the passages for high pressures while the four other fluid supply grooves (70a) cooperate respectively with four fluid discharge grooves (70b) and with the aforesaid holes of different diameters (71, 72) to define two aforesaid series of two pairs of different passages.

18. Apparatus according to claim 17, characterized in that the two other aforesaid fluid discharge grooves (70bn) do not cooperate with any of the aforesaid holes of circular contour.

* * * * *